United States Patent [19]
Hashiguchi et al.

[11] Patent Number: 5,291,350
[45] Date of Patent: Mar. 1, 1994

[54] MAGNETIC RECORDING AND REPRODUCING APPARATUS

[75] Inventors: Yasuhiro Hashiguchi; Noboru Katohno, both of Mito, Japan

[73] Assignee: Hitachi, Ltd., Tokyo, Japan

[21] Appl. No.: 764,169

[22] Filed: Sep. 23, 1991

[30] Foreign Application Priority Data

Sep. 26, 1990 [JP] Japan .................. 2-254141

[51] Int. Cl.5 ............................. G11B 15/44
[52] U.S. Cl. ....................... 360/85; 360/95
[58] Field of Search .............. 360/85, 95, 96.3, 81

[56] References Cited

U.S. PATENT DOCUMENTS

| | | |
|---|---|---|
| 3,770,281 | 11/1973 | Walburn . |
| 3,786,456 | 1/1974 | Crafts . |
| 4,660,109 | 4/1987 | Aldenhoven . |
| 4,872,075 | 10/1989 | Yamaguchi et al. ............ 360/85 |
| 5,043,832 | 8/1991 | Ueda et al. .................... 360/85 |

FOREIGN PATENT DOCUMENTS 62-865569 4/1987 Japan .

Primary Examiner—Paul M. Dzierzynski
Assistant Examiner—Richard Hanig
Attorney, Agent, or Firm—Antonelli, Terry, Stout & Kraus

[57] ABSTRACT

A magnetic recording and reproducing apparatus, wherein a rotor device is arranged in such a manner that one end of an orbiting or rotating shaft which is integral with the rotor is inserted in an opening portion of a main base plate of the apparatus, while the other end of the shaft is inserted in an opening portion of a sub-base plate opposite to the main base plate, and preferably, a plurality of such rotor devices are provided in series and engage with one another to thereby perform predetermined operations. With this construction, the number of components and the manufacturing cost can be reduced, and also, the expense for building sub-assemblies can be saved.

3 Claims, 4 Drawing Sheets

MAGNETIC RECORDING AND REPRODUCING APPARATUS

BACKGROUND OF THE INVENTION

1. Industrial Field of the Invention

The present invention relates to an arrangement of component parts of a magnetic recording and reproducing apparatus.

2. Description of the Related Art

A conventional magnetic recording and reproducing apparatus, as shown in FIGS. 3 and 4 comprises several sub-assemblies, with the sub-assemblies being mounted and assembled on a main chassis to provide a finished product, and with each sub-assembly being one unit of operational elements.

This arrangement is employed for the following reasons:

Since operation units can be checked one by one, it is possible to pick out defective unit at early stages. Additionally, the checking efficiency is higher than when the entire apparatus is checked after the units have been assembled.

When the assembly of the apparatus is conducted by an automatic assembly system, this sub-assembly arrangement enables several components to be mounted on the chassis simultaneously, so as to reduce the number of working stations on the assembly line upon manufacturing.

Transportation and storage of components can be effectively performed.

For example, referring to FIG. 3, one group of elements serves to transmit a driving force from a capstan motor 2 to a worm gear 10 within a front load mechanism (not shown) for delivering a cassette in and out of the magnetic recording and reproducing apparatus, and another group of elements serves to transmit the driving force via a torque limiter 37 for forward winding of a tape. These groups of elements are located on a common base plate 53 and constitute one sub-assembly. When this sub-assembly is mounted on a main chassis 22, two units of operation elements can be obtained at once, and it requires two working stations on the assembly line, i.e., one for mounting and the other for fastening such as screw-fastening.

As shown in FIG. 3, a magnetic tape 1 is drawn out of a cassette 17 and brought into contact with a cylinder 19 to conduct recording and reproducing. The magnetic tape 1 is held between a pinch roller 3 and a capstan 2a which is provided on the central axis of the capstan driving motor 2 and rotated along with this motor, and the magnetic tape 1 is transferred at constant speed in a direction indicated by the arrow A in response to constant-speed rotation of the capstan driving motor 2.

The rotation is transmitted to a pulley section 32a through a belt 31 extended over a pulley 2b which is coaxially provided on the capstan driving motor 2, and it is further transmitted to the driving gear 37 of the slide-type clutch mechanism via a gear 36 which meshes with a gear section 32b integral with the pulley section 32a, as shown in FIG. 4. A frictional member 24 is held between the driving gear 37 and a driven member 34, and a frictional force is generated when the driving gear 37 is biased by a spring 25, thus causing the rotation to be transmitted to the driven member 34. The rotation is then transmitted to a take-up reel base 50 via a gear 38, which is provided on an upper portion of the driven member 34, and via an oscillating gear 39. By the rotation of the take-up reel base 50, the magnetic tape 1 which has been transferred at constant speed is wound on a reel 28 within the cassette 17.

A switch gear 33 is moved up and down by a mechanism (not shown) so as to establish and interrupt the connection with a gear 35, which is integral with the worm gear 10 of the front load mechanism, through a connection gear 85.

An apparatus of this type is disclosed, for example, in Japanese Patent Unexamined Publication No. 62-86569.

SUMMARY OF THE INVENTION

In the above-described conventional technique, base plates for sub-assemblies are required. After the sub-assemblies have been mounted on the chassis, however, these base plates are of no use, that is, the base plates are not indispensable for operation of the assembled apparatus.

That is to say, a reduction of the number of components and resulting reduction of the cost are not sufficiently considered, and there is a problem in respect of the cost of the entire apparatus so that the cost of the base plates and the expense for building the sub-assemblies are additionally required.

It is therefore an object of the present invention to provide an arrangement of component parts which does not include sub-assemblies to thereby achieve reduction of the cost and which can be applied to the automatic assembly system.

In order to achieve the above-described object, there is employed a structure in which at least one rotor means, including an orbiting or rotating shaft integral with the rotor, is supported by a main chassis and a sub-base plate which extends substantially parallel to the main chassis.

A plurality of shaft-supporting holes are formed in a main chassis. Each rotor means is integral with an orbiting or rotating shaft, and the rotor means is set in position by inserting one end of the shaft in the corresponding shaft-supporting hole. When a plurality of such rotor means are provided in series on the main chassis, they engage one another in a predetermined manner, and perform predetermined operations. After mounting the group of the rotor means on the main chassis, one sub-base plate is placed at a position substantially in parallel to the main chassis. Shaft-supporting holes are formed in the sub-base plate similarly, and the other ends of the shafts of the plurality of rotor means are inserted and supported in these holes which serve as bearings.

Thus, both ends of the shafts of the rotor means can be set at predetermined positions, and the rotor means can perform predetermined operations.

DETAILED DESCRIPTION OF EMBODIMENT

Figure 2:
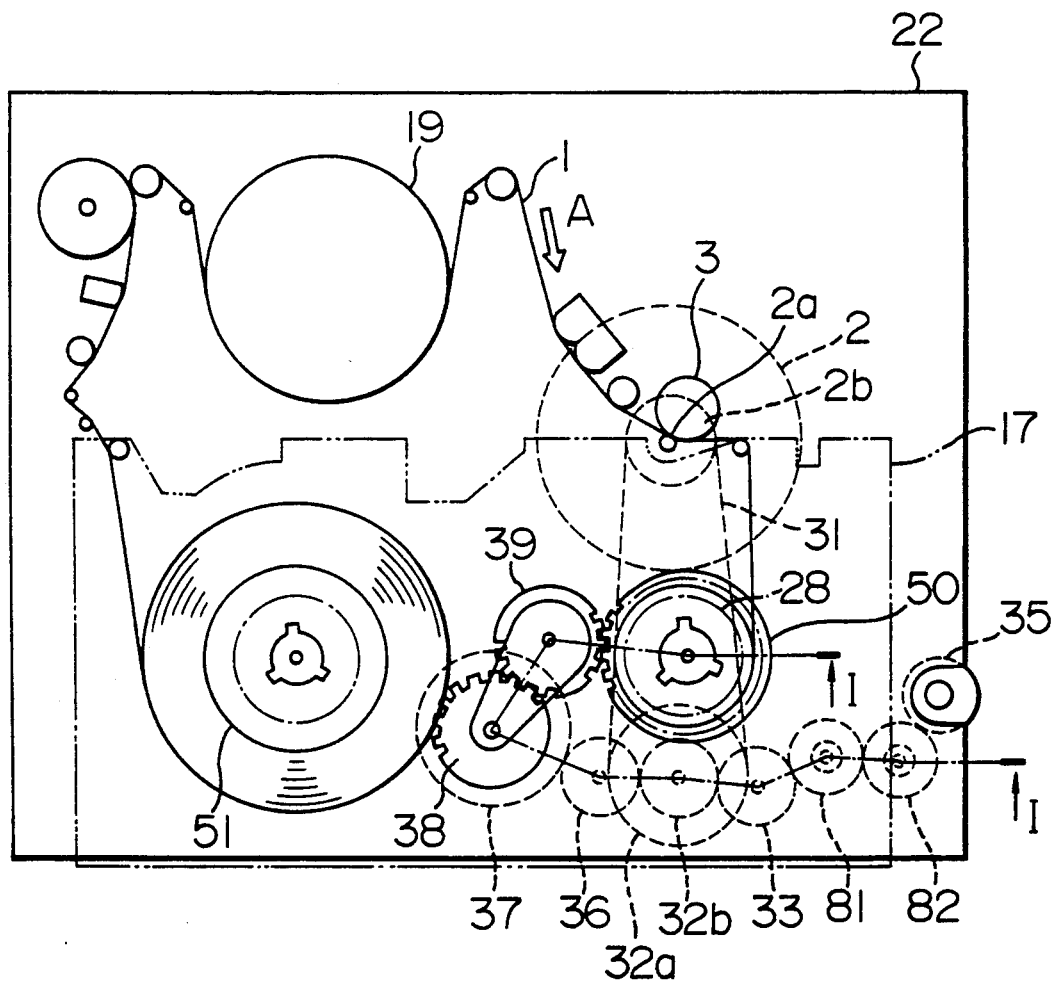
FIG. 2 is a plan view of the embodiment of FIG. 1.
Figure 3:
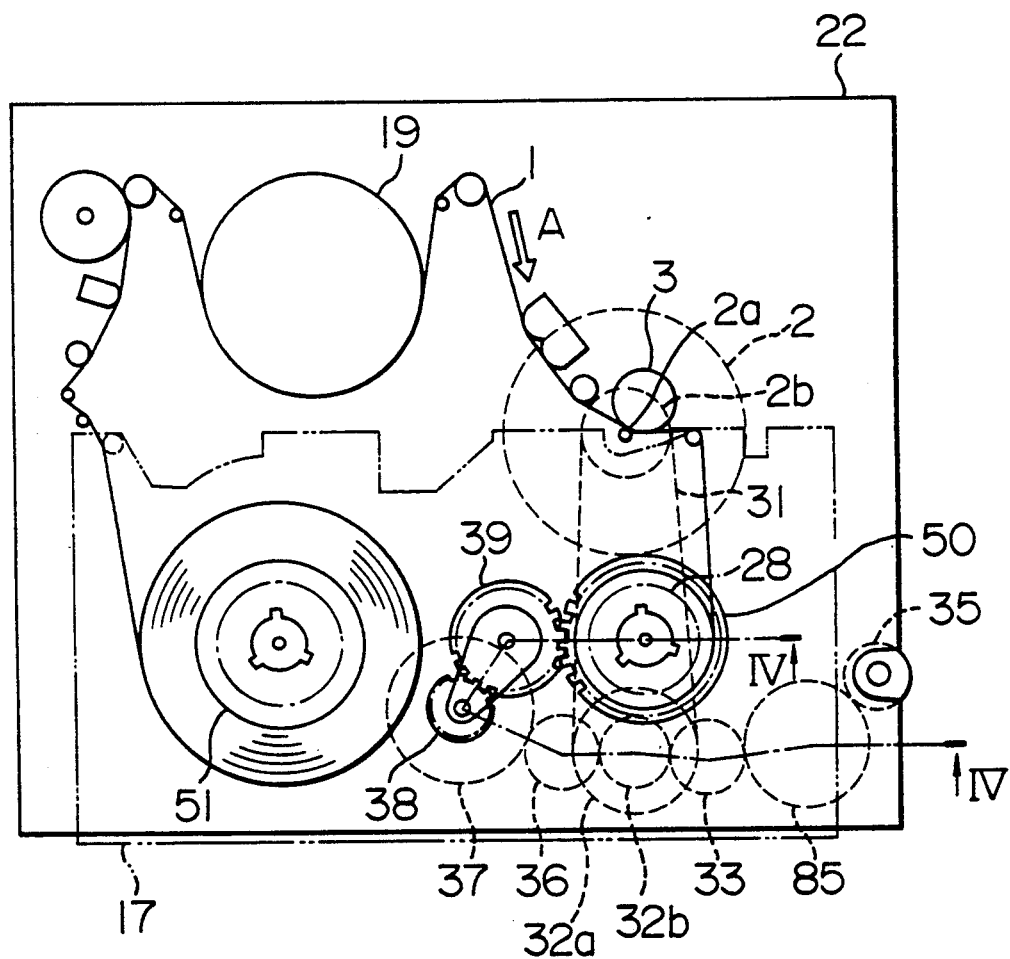
FIG. 3 is a plan view of a conventional apparatus.
Figure 4:
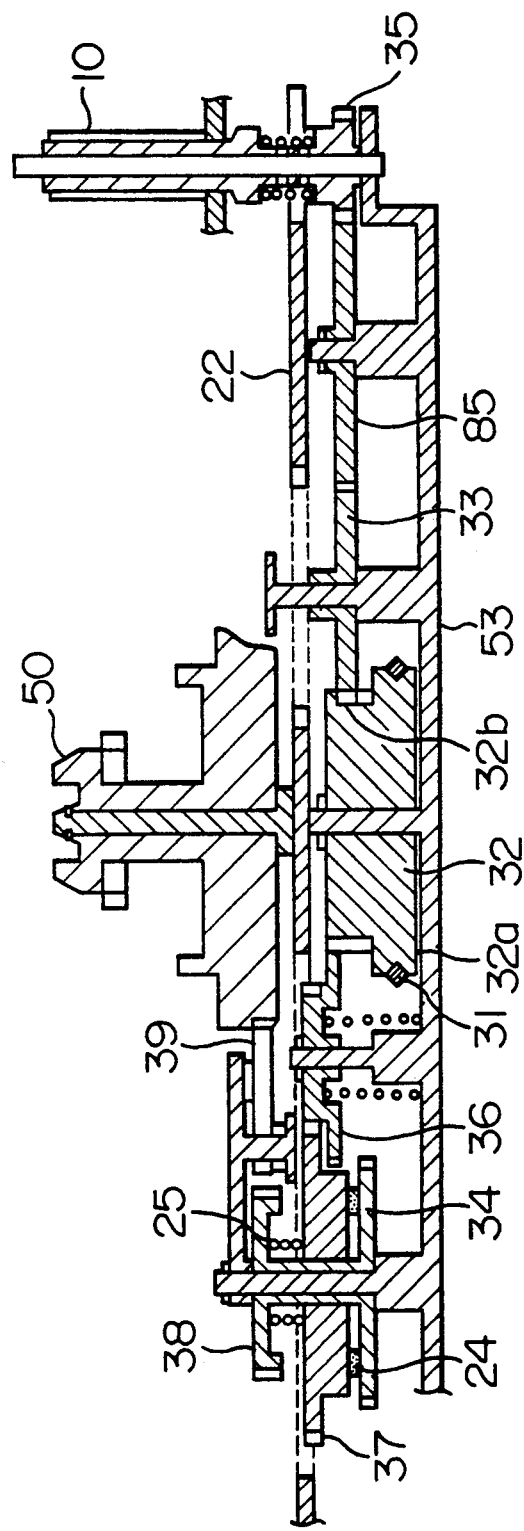
FIG. 4 is a cross-sectional view in the same, taken along the line IV—IV of FIG. 3.

FIG. 2 illustrates an entire structure of a magnetic recording and reproducing apparatus (VTR) according to the present invention when it is in a recording or reproducting state. A magnetic tape 1 is drawn out of a cassette 17 which is mounted on a chassis 22, and it is brought into contact with a cylinder 19 to conduct a recording or reproducing. The magnetic tape 1 is held between a pinch roller 3 and a capstan 2a which is provided on the central axis of a capstan driving motor 2 and rotated along with this motor, and the magnetic tape 1 is transferred at constant speed in a direction indicated by the arrow A in response to constant-speed rotation of the capstan driving motor 2.

Figure 1:
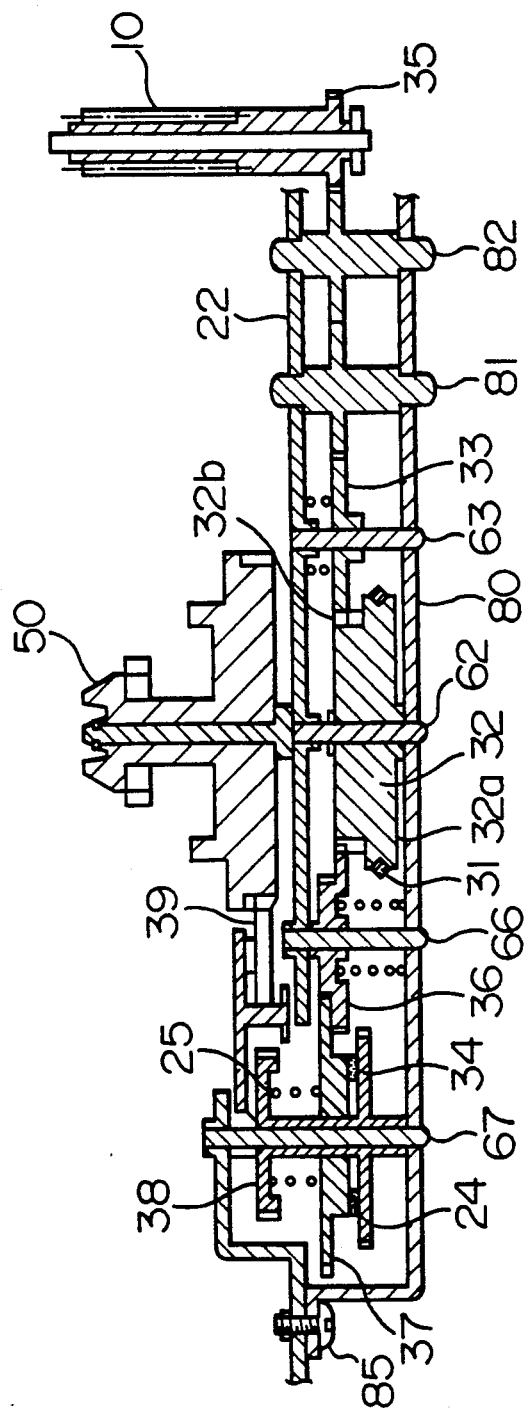
FIG. 1 is a cross-sectional view showing one embodiment according to the present invention, taken along the line I—I in FIG. 2.

The rotation is transmitted to a pulley section 32a through a belt 31 extended over a pulley 2b which is coaxially provided on the capstan driving motor 2, and it is further transmitted to a driving gear 37 of a slide-type clutch mechanism via a gear 36 which meshes with a gear section 32b integral with the pulley section 32a, as shown in FIG. 1. A frictional member 24 is held between the driving gear 37 and a driven member 34, and a frictional force is generated when it is biased by a spring 25, thus causing the rotation to be transmitted to the driven member 34. The rotation is then transmitted to a take-up reel base 50 via a gear 38, which is provided on an upper portion of the driven member 34, and via an oscillating gear 39. By the rotation of the take-up reel base 50, the magnetic tape 1, which has been transferred at constant speed, is wound on a reel 28 within the cassette 17.

Next, a train of gears for transmitting the driving force to a worm gear 10 of a front load mechanism (not shown) will be described.

A switching mechanism (not shown) causes a switch gear 33 to take either an upper position or a lower position. When the switch gear 33 meshes with the gear section 32b, as shown in FIG. 1, the switch gear 33 simultaneously meshes with a connection gear 81. The connection gear 81 meshes with a connection gear 82, and the connection gear 82, in turn, meshes with a gear 35 which is integral with the worm gear 10, so that the driving force of the capstan motor 2 is transmitted to the front load mechanism.

When the front load mechanism is not operated, the switch gear 33 is biased along a shaft 63 to take a position where the switch gear 33 can be out of engagement with the gear section 32b.

In this case, a shaft 62 of a pulley 32, a shaft 66 of the gear 36, a shaft 67 of the slide-type clutch mechanism 37, and the shaft 63 of the switch gear 33 are set on the main chassis 22. As for each of the connection gears 81 and 82, a rotational shaft is shaped to be integral with the gear. Since the connection gears 81 and 82 belong to the system for transmitting the driving force to the front load mechanism, as described above, they have no relation with to the problems in the performance of the magnetic recording and reproducing apparatus, such as wow and flutter, and jitters. Besides, they are rotated at low speed to thereby suppress the generation of noises. Therefore, it is not necessary to subject the integrally shaped shaft to special machining to improve its surface roughness.

While one end of each shaft of the abovementioned components is set in the main chassis 22, the other end is inserted in a hole of a hole train formed in a sub-chassis 80. The sub-chassis 80 extends substantially parallel to the main chassis 22, and is fastened on the main chassis 22 by screw-fasteners 85.

In the detailed description of the embodiment according to the invention, there have been explained, as one example, connection gears integral with the rotational shafts which are used in the front load mechanism. However, it goes without saying that the present invention is not limited to this embodiment. The embodiment may be selectively altered within the scope of the claims without departing from the spirit of the invention.

As an alternative of the invention, there can be adopted an arrangement in which orbiting members including cams integral with their shafts are provided between the main chassis and the sub-chassis in place of rotating members of the above-described embodiment, i.e., the rotational shafts. Such orbiting members may, for example, be a cam for pressing a pinch roller and a cam for a guide roller.

Furthermore, the present invention can be applied to component parts which require a high level of rotational preciseness, by selecting a material and improving the accuracy in machining of the surface.

According to the present invention, each component can be directly set on the main chassis, and consequently, sub-assemblies mounted on brackets or the like serving as bases can be eliminated. In other words, elimination of brackets or the like which have no relation with the original function of the magnetic recording and reproducing apparatus enables a decrease of the number of components and reduction of the manufacturing cost. Moreover, the expense for building the sub-assemblies can be saved so as to also result in a cost reduction.

What is claimed is:

1. A magnetic recording and reproducing apparatus in which a magnetic tape held in a cassette is drawn out and extended over a rotary cylinder with a magnetic head mounted thereon, and a plurality of rotors, wherein each of said plurality of rotors is formed in such a manner that a shaft thereof is integral with a rotating body of said rotor, the magnetic recording and reproducing apparatus includes a main base plate with a plurality of openings and a sub-base plate with a plurality of openings, said rotors being respectively rotatably mounted in such a manner that one end of the shaft is inserted in one of said openings provided in said main base plate, while the other end of said shaft is inserted in one of said openings provided in the sub-base plate opposite to said main base plate, and wherein said plurality of rotors are provided in series and are engageable with one another so as to transfer power from a drive source.

2. A magnetic recording and reproducing apparatus according to claim 1, wherein said rotating body of each of the rotors is a connection gear.

3. A magnetic recording and reproducing apparatus according to claim 1, wherein said rotating body of each of the rotors is an orbiting cam.

* * * * *